(12) United States Patent
Paske

(10) Patent No.: US 10,781,566 B2
(45) Date of Patent: Sep. 22, 2020

(54) PERCUSSION MECHANISM FOR A PNEUMATIC POLE OR BACKFILL TAMPER

(71) Applicant: M-B-W, Inc., Slinger, WI (US)

(72) Inventor: Benjamin J. Paske, Slinger, WI (US)

(73) Assignee: M-B-W, Inc., Slinger, WI (US)

( * ) Notice: Subject to any disclaimer, the term of this patent is extended or adjusted under 35 U.S.C. 154(b) by 255 days.

(21) Appl. No.: 15/869,923

(22) Filed: Jan. 12, 2018

(65) Prior Publication Data

US 2018/0135268 A1   May 17, 2018

Related U.S. Application Data

(62) Division of application No. 14/715,162, filed on May 18, 2015, now abandoned.

(51) Int. Cl.
*E02D 3/046* (2006.01)
*F16F 3/04* (2006.01)

(52) U.S. Cl.
CPC ............ *E02D 3/046* (2013.01); *F16F 3/04* (2013.01)

(58) Field of Classification Search
CPC ................................. E02D 3/046; F16F 3/04
USPC ..................................................... 173/90, 210
See application file for complete search history.

(56) References Cited

U.S. PATENT DOCUMENTS

| | | | |
|---|---|---|---|
| 1,102,652 A | 7/1914 | Gibb et al. | |
| 2,875,731 A | 3/1959 | Settles et al. | |
| 3,565,287 A * | 2/1971 | Johnston | G01F 11/04 222/26 |
| 3,696,593 A | 10/1972 | Thorud et al. | |
| 3,722,960 A * | 3/1973 | Von Lowis Of Menar | B60T 8/4233 303/122.09 |
| 3,779,135 A * | 12/1973 | Sugimura | F15B 11/076 91/45 |
| 3,821,992 A | 7/1974 | Matsuo | |
| 3,847,498 A * | 11/1974 | Grane | E02D 3/068 404/133.1 |
| 4,055,281 A * | 10/1977 | Rosen | B65B 3/32 222/309 |
| 4,071,094 A | 1/1978 | Kilin et al. | |
| 4,083,290 A * | 4/1978 | Andres | F15B 11/121 137/625.11 |

(Continued)

FOREIGN PATENT DOCUMENTS

| | | |
|---|---|---|
| JP | 56062026 U | 5/1981 |
| JP | 2005058080 A | 3/2005 |

OTHER PUBLICATIONS

Search Report for Great Britain Application GB1708217.3 dated Nov. 24, 2017.

*Primary Examiner* — Robert F Long
(74) *Attorney, Agent, or Firm* — Andrus Intellectual Property Law, LLP

(57) ABSTRACT

A percussion action pneumatic tool for compacting backfill areas including a vibration isolator and a percussion mechanism. The vibration isolator includes an inner shaft and an outer sleeve attached to a pair of springs. The springs dampen vibration or feedback transferred from the percussion mechanism to the outer sleeve and felt by the operator. The percussion mechanism includes a pair of elbows and an air conduit which allows the airflow to move through a second flow path into a second air space when the valve assembly directs the airflow through the second flow path.

28 Claims, 5 Drawing Sheets

(56) References Cited

U.S. PATENT DOCUMENTS

| | | | | |
|---|---|---|---|---|
| 4,175,473 A * | 11/1979 | Iizumi | ............... | F15B 11/02 91/443 |
| 4,200,978 A | 5/1980 | Irelan et al. | | |
| 4,223,808 A * | 9/1980 | Williams | ........... | B65D 83/0038 222/327 |
| 4,290,489 A | 9/1981 | Leavell | | |
| 4,311,185 A * | 1/1982 | Zimmerman | ........ | B22D 17/203 164/315 |
| 4,402,369 A | 9/1983 | Nikitin et al. | | |
| 4,409,886 A * | 10/1983 | Herner | ............... | F15B 11/15 91/298 |
| 4,446,930 A | 5/1984 | Nilsson et al. | | |
| 4,477,343 A * | 10/1984 | Tucker | ............... | B01D 35/153 210/108 |
| 4,483,402 A | 11/1984 | Vonhoff, Jr. | | |
| 4,579,040 A * | 4/1986 | Masuda | ............... | B62D 5/083 137/625.24 |
| 4,913,331 A * | 4/1990 | Utsumi | ............... | B25C 1/08 227/10 |
| 5,092,362 A | 3/1992 | Yie | | |
| 5,119,667 A | 6/1992 | Hollis et al. | | |
| 5,392,865 A * | 2/1995 | Piras | ............... | B25D 9/145 173/137 |
| 5,445,227 A | 8/1995 | Heppner | | |
| 5,620,027 A * | 4/1997 | Sato | ............... | F15B 13/04 137/625.66 |
| 5,645,370 A | 7/1997 | Zurbes et al. | | |
| 5,934,162 A * | 8/1999 | Habermehl | ........... | B25B 23/045 227/136 |
| 6,095,256 A | 8/2000 | Lindsay | | |
| 6,102,022 A | 8/2000 | Schave | | |
| 6,250,977 B1 * | 6/2001 | Ness | ............... | B63H 11/12 114/315 |
| 6,293,729 B1 | 9/2001 | Greppmair | | |
| 6,315,059 B1 | 11/2001 | Geldean | | |
| 6,435,767 B1 | 8/2002 | Steffen | | |
| 6,435,843 B1 * | 8/2002 | Hur | ............... | F04B 9/115 417/393 |
| 6,536,324 B1 * | 3/2003 | Boissiere | ............... | F41A 25/20 89/14.3 |
| 6,582,155 B1 | 6/2003 | Bromberger et al. | | |
| 6,619,125 B2 | 9/2003 | Laugwitz | | |
| 6,860,228 B2 * | 3/2005 | Maier, Jr. | ............... | A01J 5/08 119/14.07 |
| 7,052,475 B2 * | 5/2006 | Kim | ............... | A61H 7/004 601/103 |
| 7,293,684 B1 * | 11/2007 | Wen | ............... | B25C 1/045 123/46 SC |
| 7,540,336 B2 | 6/2009 | Steffen | | |
| 7,717,548 B2 * | 5/2010 | Tatsumi | ............... | B41J 2/17513 347/85 |
| 8,636,088 B2 * | 1/2014 | Muuttonen | ............... | B25D 9/14 173/112 |
| 8,720,602 B2 * | 5/2014 | Saf | ............... | B25D 9/125 173/201 |
| 8,733,468 B2 * | 5/2014 | Teipel | ............... | B25D 9/12 173/135 |
| 9,271,620 B2 * | 3/2016 | Meredith | ............... | A47L 5/365 |
| 9,347,709 B2 * | 5/2016 | Schantl | ............... | F27D 3/1527 |
| 2001/0014291 A1 * | 8/2001 | Nishio | ............... | F04B 13/02 417/395 |
| 2001/0043007 A1 * | 11/2001 | Jang | ............... | B25D 9/145 299/69 |
| 2006/0165488 A1 | 7/2006 | Morris et al. | | |
| 2006/0272837 A1 | 12/2006 | Steffen | | |
| 2007/0172364 A1 * | 7/2007 | McNichol | ............... | F04B 9/107 417/401 |
| 2007/0204887 A1 | 9/2007 | Wood | | |
| 2008/0247824 A1 | 10/2008 | Steffen | | |
| 2009/0321099 A1 * | 12/2009 | Birath | ............... | B25D 9/16 173/1 |
| 2010/0327039 A1 * | 12/2010 | Adams | ............... | B25C 1/08 227/9 |
| 2011/0155403 A1 | 6/2011 | Rohrer | | |
| 2011/0179757 A1 | 7/2011 | Scott-Stanbridge et al. | | |
| 2011/0220819 A1 * | 9/2011 | Wiedenmann | ........ | F15B 15/068 251/63.6 |
| 2011/0290850 A1 * | 12/2011 | Wu | ............... | B25C 1/04 227/130 |
| 2013/0004237 A1 | 1/2013 | Krings et al. | | |
| 2013/0118769 A1 | 5/2013 | Lee | | |
| 2013/0255985 A1 * | 10/2013 | Zakuskin | ............... | B25D 9/10 173/209 |
| 2013/0279980 A1 * | 10/2013 | Steffen | ............... | E02D 3/046 404/75 |
| 2014/0208575 A1 | 7/2014 | Jagdale et al. | | |
| 2014/0262400 A1 | 9/2014 | Berger et al. | | |
| 2014/0290971 A1 * | 10/2014 | Kaindlbauer | ........... | B25D 9/26 173/1 |
| 2015/0102084 A1 * | 4/2015 | Zhao | ............... | B25C 1/08 227/10 |
| 2016/0258250 A1 * | 9/2016 | Vick, Jr. | ............... | E21B 34/10 |
| 2016/0297058 A1 | 10/2016 | Lilja et al. | | |
| 2018/0283561 A1 * | 10/2018 | Shu | ............... | F16K 5/06 |

* cited by examiner

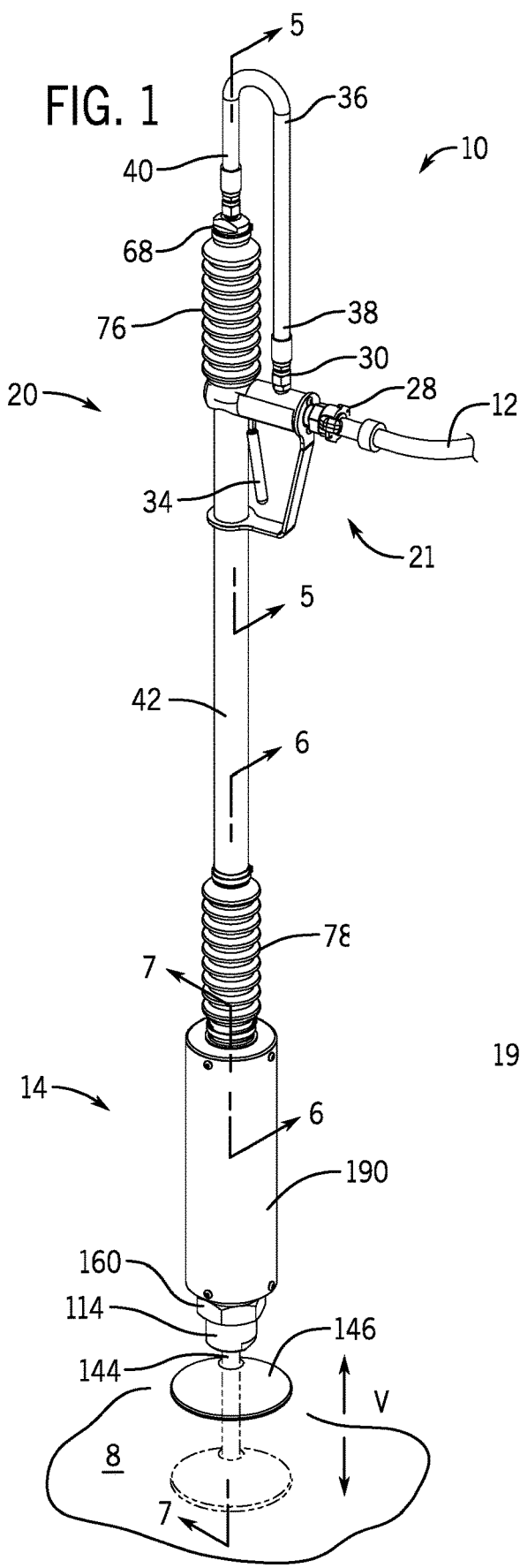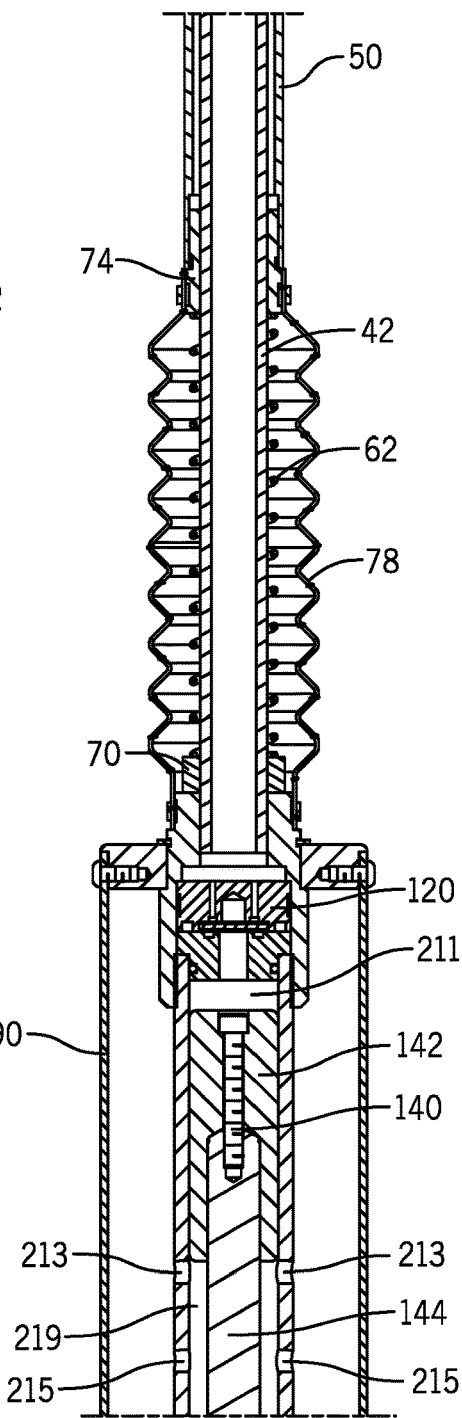

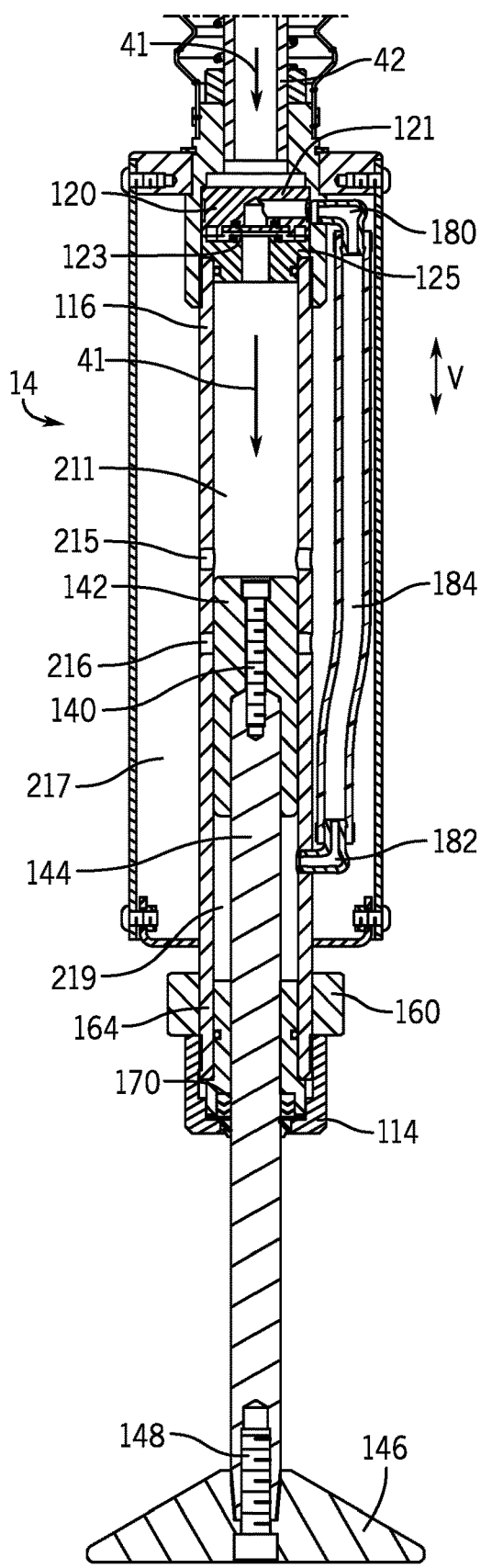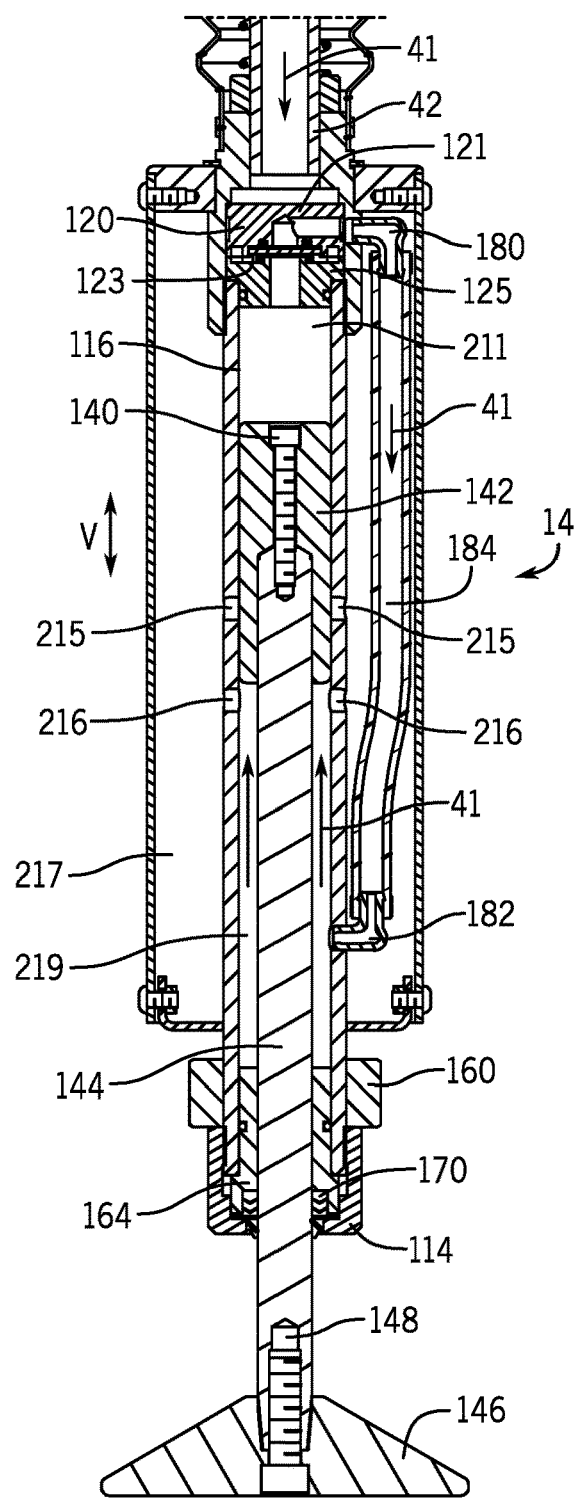

PERCUSSION MECHANISM FOR A PNEUMATIC POLE OR BACKFILL TAMPER

CROSS REFERENCE TO RELATED APPLICATION

This application is a divisional of U.S. patent application Ser. No. 14/715,162, filed on May 18, 2015, which published on Nov. 24, 2016, as U.S. Patent Publication No. 2016/0340849, the content of which is incorporated herein by reference in its entirety.

FIELD

The present disclosure relates to soil compaction using tampers, and more particularly to pneumatic pole or backfill tampers for compacting backfill.

BACKGROUND

The following U.S. patents are incorporated herein by reference in their entirety:

U.S. Pat. No. 7,540,336 discloses a vibration isolation assembly provided for use with a backfill tamper. In use, the vibration isolation assembly can be disposed between a handle and a percussion mechanism of the tamper and absorbs kickback forces from the percussion mechanism during backfill tamper operation. In one embodiment, the assembly includes an elongated conduit member that defines a passageway that allows compressed air to pass through the member to the percussion mechanism and a vibration dampening piston arrangement for absorbing feedback forces from the percussion mechanism during backfill tamper operation. The assembly may further include a spring arrangement for dampening vibration emanating from the piston.

U.S. Pat. No. 4,402,369 discloses a percussive-action pneumatic tool comprising a handle-carrying frame having successively accommodated therein a shock-absorber and a housing with the percussion mechanism therein, connected through a gas distribution system to a compressed air source. The frame has a length sufficient for abutting against the surface of a material being worked and has a guide which receives the housing with the percussion mechanism. The shock-absorber includes a receptacle mounted on the frame and communicating via a controllable valve alternatively with the compressed air source and the atmosphere, a rod being mounted in this receptacle, adapted to act upon the housing with the percussion mechanism, to move the housing relatively to the frame as compressed air is supplied into the receptacle.

Tampers are used by a wide range of entities including municipalities and utility companies to compact backfill areas. Often large compactors cannot access small backfill areas without disturbing the installed items, such as light poles, foundation walls, and the like. Tampers are often used in these applications because they are small, lightweight, and can compact backfill areas without damaging surrounding areas and/or items. Pneumatic tampers are especially useful as many mobile vehicles are equipped with air compressors which can be used with the pneumatic tampers and a variety of other hand-operated tools.

Tampers are also known to be operated for long periods of time as the operator compacts the backfill area. Accordingly, a relatively large amount of vibration or feedback is felt by the operator. The vibration or feedback can cause fatigue and/or serious injury to the operator if the vibrations or feedback from the tamper are experienced for prolonged periods of time. A tamper without any means of dampening vibrations can cause the operator to experience an amount of vibrations in excess of the recommended vibration limits established by experts in the field. Surpassing these recommended vibration limits can lead to permanent disabilities, such as White finger, carpal tunnel, arthritis and other ailments or injuries.

SUMMARY

This summary is provided to introduce a selection of concepts that are further described herein below in the detailed description. This summary is not intended to identify key or essential features of the claimed subject matter, nor is it intended to be used as an aid in limiting the scope of the claimed subject matter.

In one example, a vibration isolator apparatus for use with a percussion mechanism includes an inner shaft and an outer sleeve. The outer sleeve is slidably received around the inner shaft. A first spring and a second spring, each having a first end and second end respectively, are also included. The first spring is connected to the upper end of the outer sleeve and the second spring is connected to the lower end of the outer sleeve. When the inner shaft is connected to the percussion mechanism, the first spring and the second spring limit the vibration transferred to the outer sleeve from the percussion mechanism.

In another example, the pneumatic percussion mechanism includes a percussion shaft. The percussion shaft has a first end and second end and receives an airflow. A compaction assembly is also included. The assembly includes a ram head and a compaction rod, and the assembly is slidingly received in the percussion shaft. The assembly defines a first air space and a second air space within the percussion shaft. Also included are a valve assembly, a first elbow, a second elbow, and an air conduit. The air conduit connects to the first elbow and the second elbow. The first elbow is further connected to the valve assembly, and the second elbow is further connected to the percussion shaft. The valve assembly alternates the direction of the airflow from a first flow path to a second flow path. The first flow path is connected to the first air space and the second flow path is connected to the second air space. The second flow path is defined by the first elbow, air conduit, and second elbow. When the airflow moves through the first flow path, the first air space expands, the second air space shrinks, and the ram head moves downward in the percussion shaft. When the airflow moves through the second flow path, the second air space expands, the first air space shrinks, and the ram head moves upward in the percussion shaft.

Various other features, objects and advantages of the invention will be made apparent from the following description taken together with the drawings.

BRIEF DESCRIPTION OF THE DRAWINGS

Examples of the vibration isolator are described herein below with reference to the following drawing Figures. The same numbers are used throughout the Figures to reference like features and components.

FIG. 1 is an isometric view of a pneumatic tamper.

FIG. 6 is a cross sectional view along 6-6.

FIG. 7A is a cross sectional view along 7-7 when a ram head is in a down position.

FIG. 7B is a cross sectional view along 7-7 when a ram head is in an up position.

DETAILED DESCRIPTION OF THE DRAWINGS

Figure 2:
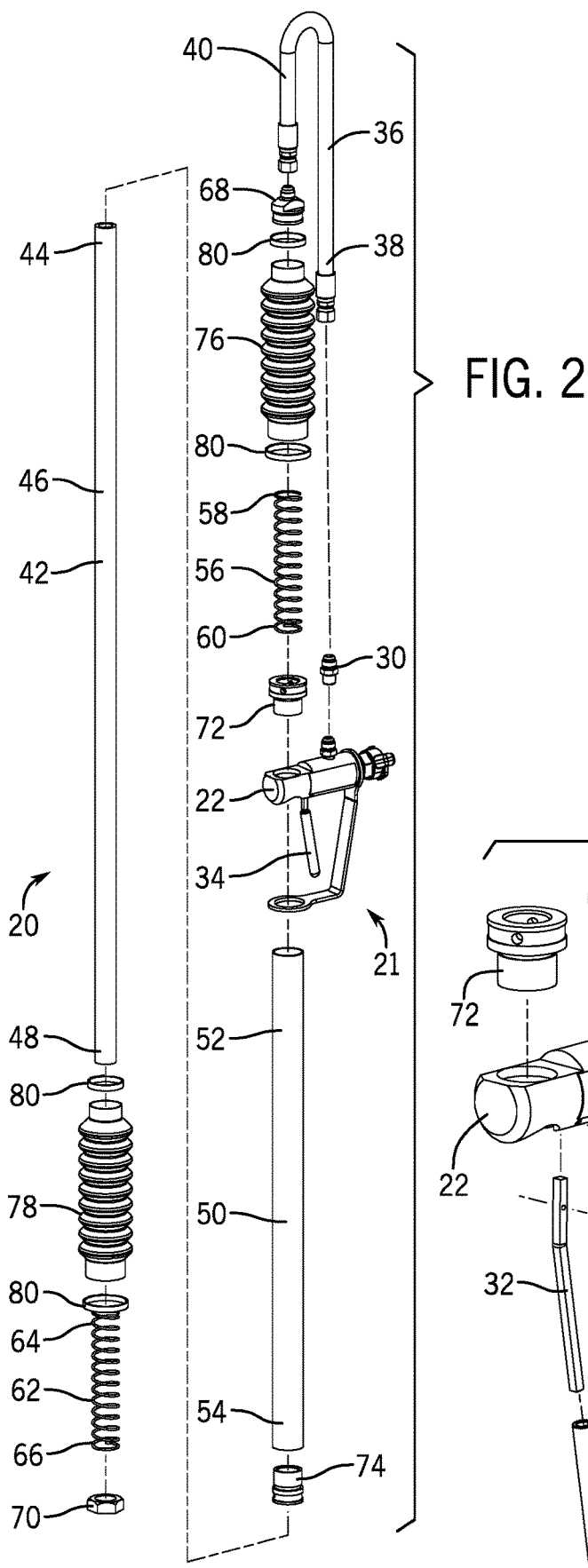
FIG. 2 is an exploded view of a vibration isolator.

In the present description, certain terms have been used for brevity, clearness, and understanding. No unnecessary limitations are to be implied here from beyond the requirements of the prior art because such terms are used for descriptive purposes only and are intended to be broadly construed. The different systems and methods described herein may be used alone or in combination with other systems and methods. Various equivalents, alternatives, and modifications are possible within the scope of the amended claims.

FIGS. 1-7B depict the present disclosure of a pneumatic tamper 10. The tamper 10 includes a percussion mechanism 14, a vibration isolator 20, and an actuator handle 21. The actuator handle 21 is held by an operator and includes components that control the movement of airflow 41 through the tamper 10 from a pneumatic air source 12. The actuator handle 21 also includes adapters and/or connectors for connecting the air source 12 to the tamper 10, further described herein.

Figure 3:
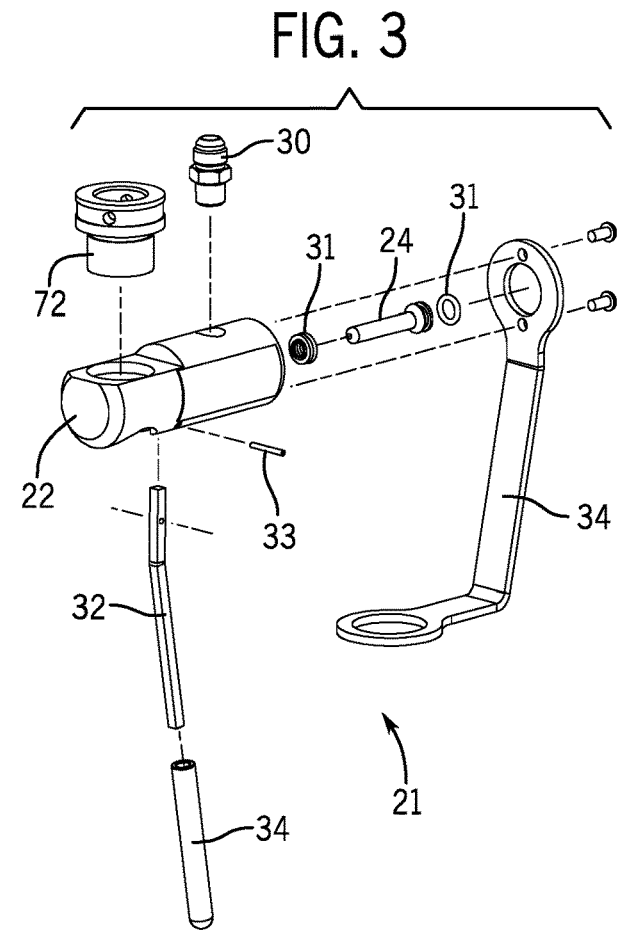
FIG. 3 is an exploded view of an actuator handle.
Figure 5A:
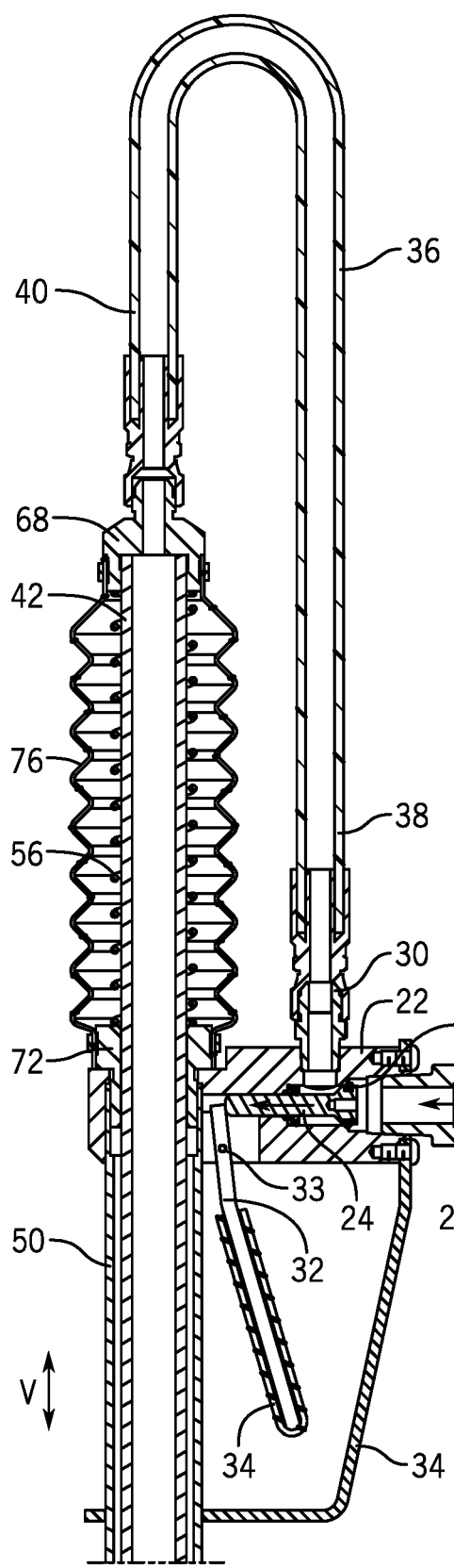
FIG. 5A is a cross sectional view along 5-5 when an actuator handle is connected to an air source.
Figure 5B:
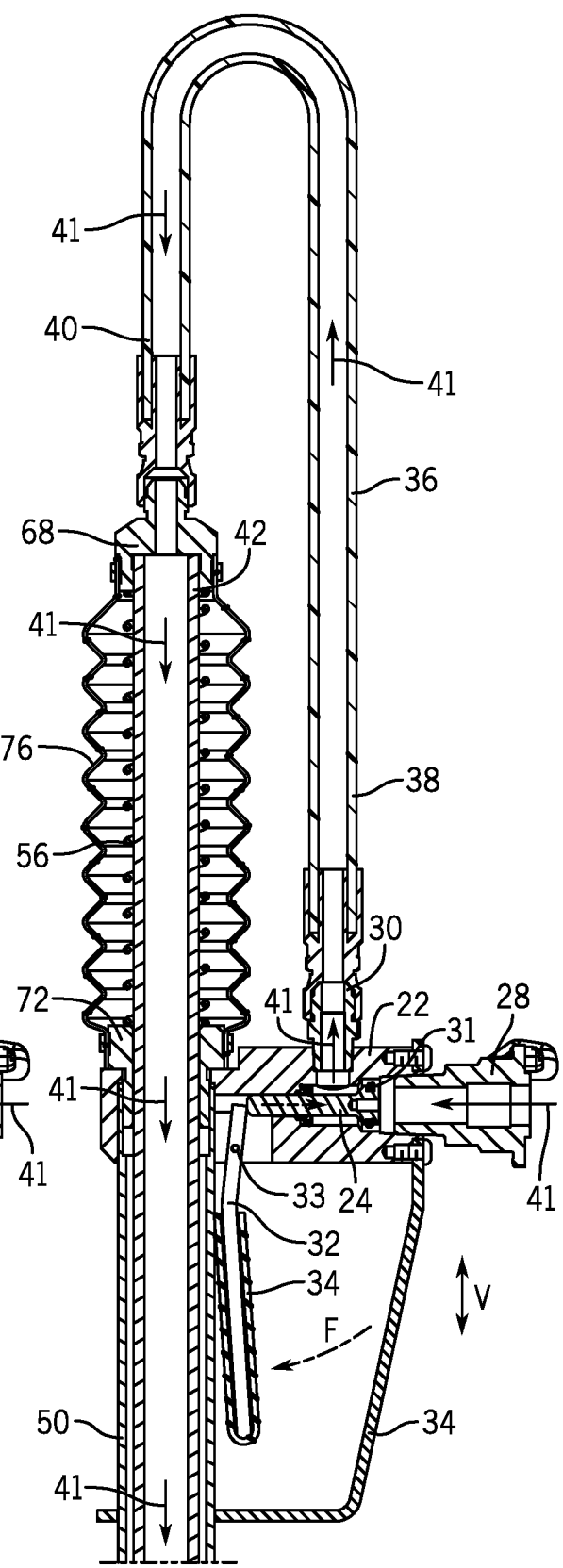
FIG. 5B is a cross sectional view along 5-5 when an actuator handle is connected to an air source and a force is acting on a trigger.

As depicted in FIGS. 3, 5A, and 5b, the actuator handle 21 includes a valve body 22, gaskets 31, a trigger 32, trigger guards 34, and an air hose 36. The air hose 36 includes a first end 38 and a second end 40. The trigger 32 is arranged to control airflow 41 from an air source 12. Gaskets 31 are included to create airtight and/or watertight seals between components. In a closed position, as depicted in FIG. 5A, a spool 24 including a groove for a gasket 31 blocks the airflow 41 from moving through the valve body 22. When a force F is applied to the trigger 32, as depicted in FIG. 5B, the trigger 32 pivots about a pivot pin 33 into and moving the spool 24. The movement of the spool 24 pushes the gasket 31 away from the valve body 22 allowing the airflow 41 to move from the air compressor connector 28 into the valve body 22.

The valve body 22 directs the airflow 41 to a fitting 30 connected to the valve body 22, and the fitting 30 is connected to the first end 38 of the air hose 36. The airflow 41 moves through the air hose 36 to an upper cap 68 included with the vibration isolator 20.

Continuing to FIGS. 5A-5B, the vibration isolator 20 provides a pathway for the airflow 41 to move from the actuator handle 21 to the percussion mechanism 14. The percussion mechanism 14 creates cyclical percussion motion from the airflow 41. The vibration isolator 20 also absorbs vibration or feedback from the percussion mechanism 14, which is described further herein. Referring to FIG. 2, the vibration isolator 20 is depicted in greater detail. It is contemplated that the vibration isolator 20 may be added to an existing tamper or provided with a new tamper 10. It is further contemplated that the vibration isolator 20 may be used in other applications and with other equipment to reduce the vibrations or feedback felt by the operator. Through experimentation and research, the inventors recognized that it is also desirable to use a vibration isolator that incorporates multiple springs or other isolator devices to dampen or limit the vibration or feedback from the percussion mechanism 14 felt by the operator. Multiple springs also may be desirable when replacing, inspecting, and/or removing components of the vibration isolator 20.

Turning now to FIG. 2, the vibration isolator 20 is connected to the actuator handle 21. The vibration isolator 20 includes a hollow inner shaft 42, an outer sleeve 50, a first spring 56, a second spring 62, an upper cap 68, a lower cap 70, an upper bushing 72, and a lower bushing 74. A person of ordinary skill in the art will recognize that any component of the vibration isolator 20 may be integral with other components. Also, a person of ordinary skill in the art may recognize that any number of springs may be used.

The hollow inner shaft 42 allows the airflow 41 to move to the percussion mechanism 14. The hollow inner shaft 42 includes a first end 44, an intermediate portion 46, and a second end 48. In one example, the hollow inner shaft 42 has a circular cross-section. The outer sleeve 50, which includes an upper end 52 and a lower end 54, is slidingly positioned or received on the intermediate portion 46 of the hollow inner shaft 42. In one example, the outer sleeve 42 is hollow and has a circular cross section. The first spring 56, which includes a first end 58 and a second end 60, is also slidingly received on the first end 44 of the hollow inner shaft 42. Similarly the second spring 62, which includes a first end 64 and a second end 66, is slidingly received on the second end 48. The springs 56, 62 may be any type of spring or device known to those of ordinary skill in the art that dampen or limit vibrations felt by the operator including compression springs, extension springs, torsion springs, constant force springs, shocks, and the like.

In some examples, an upper bellows 76 and/or a lower bellows 78 are slidingly received around the first spring 56 and second spring 62, respectively, to protect the springs 56, 62 from external contaminates and inadvertent contact by the operator. The bellows 76, 78 may elastically deform to maintain the separation between the exterior of the environment and the components of the vibration isolator 20. The bellows 76, 78 may be constructed of any suitable material including rubber, plastic, fabric, metal, and the like.

In one example, the upper cap 68 is connected to the upper end 44 of the hollow inner shaft 42 and the first end 58 of the first spring 56. Similarly, the lower cap 70 is connected to the lower end 48 of the hollow inner shaft 42 and the second end 66 of the second spring 62. The upper cap 68, the hollow inner shaft 42, and the lower cap 70 constitute a piston which reciprocates in the vertical direction V within the outer sleeve 50. In some instances, the second end 60 of the first spring 56 is connected to the upper end 52 of the outer sleeve 50 and the first end 64 of the second spring 62 is connected to the lower end 54 of the outer sleeve 50. In another example, the upper bushing 72 may be connected to the upper end 52 of the outer sleeve 50 and the second end 60 of the first spring 56. The upper bushing 72 may also be connected to the valve body 22. The lower bushing 74 may be connected to the lower end 54 of the outer sleeve 50 and the first end 64 of the second spring 62. The upper bushing 72 and lower bushing 74 may be made of any suitable material including metal, steel, brass, bronze, metal alloy, plastic, and the like. One of ordinary skill in the art will recognize that the metal components may be made of different metals and/or alloys to minimize friction and wear with other surfaces and metals. It should also be known to those of ordinary skill in the art that any of the components of the tamper 10 may be connected to each other be any number of connections or combinations of connections.

Exemplary connections may include screws, bolts, zip-ties 80, collars, friction clamps, connector rings, adhesives, screw threads, and the like.

In one example, the percussion mechanism 14 (see FIGS. 4 and 7A-7B) is connected to the lower end 48 of the hollow inner shaft 42 and/or the lower cap 70. The cyclical percussion motion of the percussion mechanism 14 causes the hollow inner shaft 42 to reciprocate in a vertical direction V. Movement in the vertical direction V causes the second spring 62 to compress and the first spring 56 to stretch as the hollow inner shaft 42 and/or the lower cap 70 move downward. The forces acting on the second spring 62 and the first spring 56 are reversed when the cyclical percussion motion of the percussion mechanism 14 reverses direction. The cooperation of the first spring 56 and second spring 62 decreases the vibrations or feedback transferred to the outer sleeve 50, and therefore, limits, reduces, and/or dampens the cyclical percussion motion felt by the operator.

The first spring 56 and the second spring 62 may be any length and stiffness as required to dampen the vibration or feedback from the percussion mechanism 14. The stiffness of the springs 56, 62 may be determined by the range of expected operating pressures, the degree of isolation desired, and the percussion mechanism 14. The first spring 56 stiffness and/or length may be the same or different than the second spring 62. It is also contemplated that the springs 56, 62 can be easily changed and/or replaced.

Figure 4:
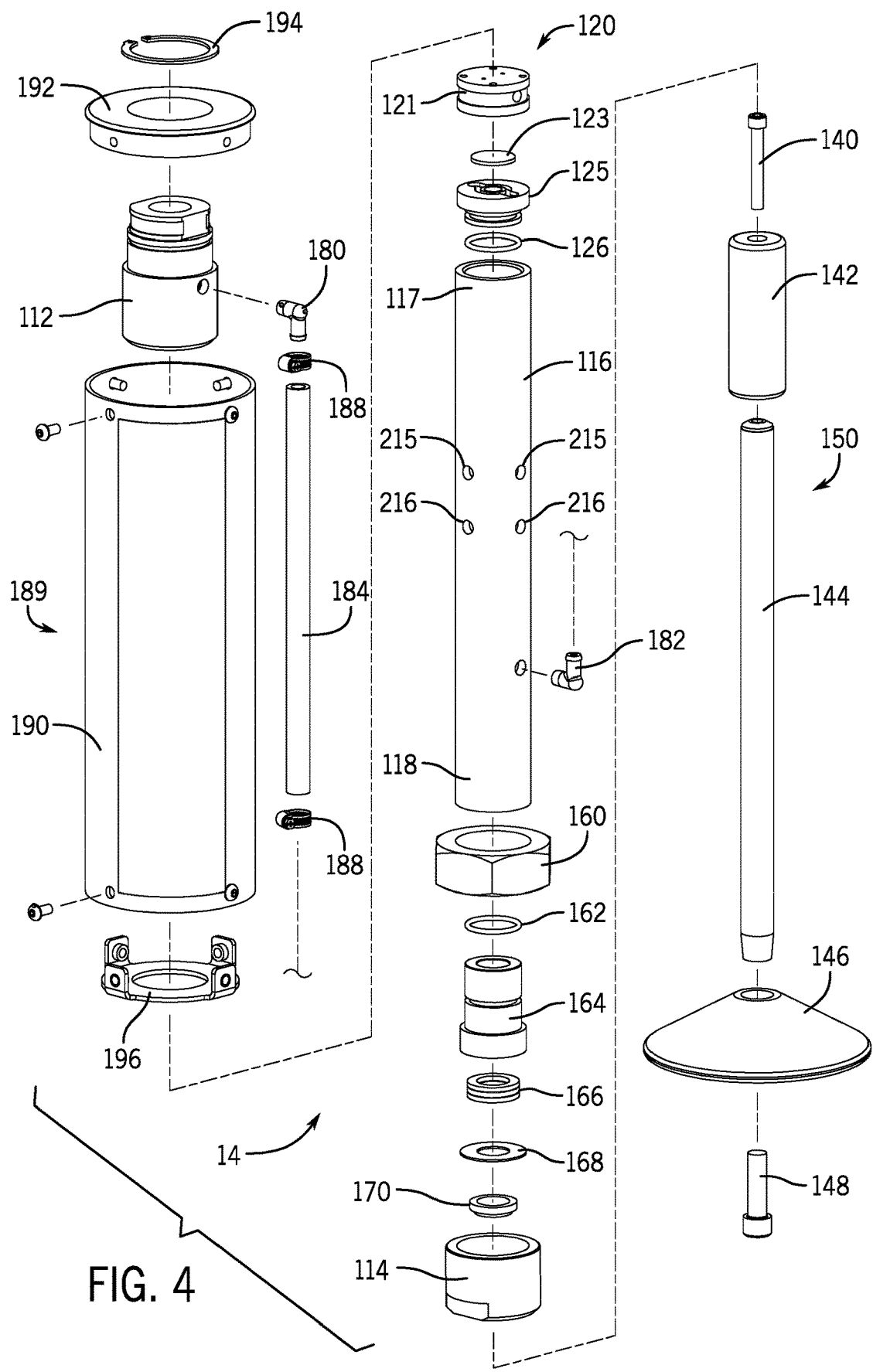
FIG. 4 is an exploded view of a percussion mechanism.

Referring now to FIG. 4, the percussion mechanism 14 is depicted in detail. The percussion mechanism 14 uses the airflow 41 to create a repetitive and/or cyclical percussion motion used to compact backfill. The motion is created when the airflow 41 moves through a series of valves, paths, channels, and/or other components, further described herein. The number and depth of the percussion motion may also vary based on the specific applications of the tamper 10. For instance, the percussion mechanism 14 may drive a shoe 146 with a five-inch stroke at 500 beats per minute. It should be known by those of ordinary skill in the art that any suitable stroke and speed may be used in conjunction with the aspects of this disclosure.

Prior art percussion mechanisms have been constructed from solid metal cylinders which have multiple hollow drilled paths and/or channels. Through experimentation and research, the inventors recognized that the solid metal cylinders are heavy and did not facilitate easy replacement of components. It is also desirable to minimize the number of the bores drilled into the cylinders and reduce the weight of the percussion mechanism.

In one example, the percussion mechanism 14 includes a percussion shaft 116 having a first end 117 and a second end 118 positioned or received between an upper percussion cap 112 and the lower percussion cap 114. A compaction assembly 150 is slidably positioned or received in the percussion shaft 116 and is further described herein. The percussion shaft 116 in the example depicted is a thin-walled elongated cylinder. One of ordinary skill in the art would recognize that the percussion shaft 116 may take any suitable shape and be made of any suitable material including metal, plastic, and the like.

In some instances, airflow 41 moves from an air source 12 through the vibration isolator 20 into the percussion mechanism 14. A valve assembly 120 is included at the upper end 117 and includes an upper valve 121, a valve disc 123, a lower valve 125, and a gasket 126. The upper valve 121 and/or the lower valve 125 include air inlets and paths which direct the airflow 41 through a plurality of flow paths to a plurality of air spaces, to be described further herein. In one example, a first flow path directs the airflow 41 to a first air space 211 and a second flow path directs the airflow 41 to a second air space 219. The valve disc 123 blocks and/or obstructs certain air inlets and paths to certain air flow paths when the pressure changes in the percussion shaft 116 during the cyclical percussion motion of the percussion mechanism 14 and/or the movement of the airflow 41.

The lower end 118 of the percussion shaft 116 slidingly receives a compaction assembly 150. The compaction assembly 150 includes a bolt 140, a ram head 142, and compaction rod 144. The lower end of the compaction rod 144 protrudes outwardly from the lower end 118. The compaction rod 144 is connected to a shoe 146 by a bolt 148. The shoe 146 contacts the ground 8 with a cyclical percussion motion when the percussion mechanism 14 is operating. The compaction assembly 150 moves between an up position and a down position based on the airflow 41 and changing volumes of the air spaces in the percussion shaft 116. A jam nut 160, a gasket 162, a percussion bushing 164, a gasket 166, a shroud cover 168, a shaft wiper 170, and the lower percussion cap 114 may also be connected to the lower end 118.

The percussion mechanism 14 also includes an upper elbow 180, a lower elbow 182, and an air conduit 184. The upper elbow 180 is connected to the upper percussion cap 112, and the lower elbow is connected to the percussion shaft 116. The air conduit 184 may be connected to the upper elbow 180 and lower elbow 182 by clamps 188. However, one having ordinary skill in the art will recognize that other connectors including rivets, screws, screw clamps, bolts, zip ties, and the like may be used to connect the air conduit 184 to the upper elbow 180 and lower elbow 182. Also, the upper elbow 180, lower elbow 182, and air conduit 184 may be made out of any suitable material including rubber, plastic, metal, a flexible material, a rigid material, and the like.

A shroud assembly 189 may surround the percussion mechanism 14 to protect the components from external forces and prevent injury to operators. The shroud assembly 189 includes a retaining ring 194, a top closure 192, a shroud 190, and a bottom closure 196. The components of the shroud assembly 189 may be replaceable. Also, the shroud assembly 189 may be removable allowing access to components of the percussion assembly 14, such as for inspection and/or maintenance purposes. The shroud assembly 189 may be constructed out of any suitable material including plastic, metal, ceramic, and the like. The shroud assembly 189 may also reduce noise coming from the percussion mechanism 14 and minimize the amount of foreign matter, such as dirt and water, entering the percussion mechanism 14 through upper relief holes 215 and lower relief holes 216, as further described herein.

Now turning to FIGS. 7A-7B, an exemplary operation of the percussion mechanism 14 is depicted. FIG. 7A depicts the ram head 142 in an up position. The airflow 41 moves through the upper percussion cap 112 and through the air inlets and paths of the valve assembly 120 that are not obstructed by the valve disc 123. The airflow 41 moves into the first air space 211 increasing the air pressure in the first air space 211. In response, the first air space 211 expands forcing the ram head 142 downward in the percussion shaft 116. The second air space 219 shrinks in volume during the expansion of the first air space 211. The first air space 211 continues to expand until the top of the ram head 142 passes an upper relief hole 215. The airflow 41 permitted to move from the first air space 211 through the upper relief hole 215 into the relief air space 217 causing the pressure in the first air space 211 to decrease. The release of pressure from the first air space 211 changes the pressure acting on the valve assembly 120 and/or valve disc 123. The change in pressure causes the valve disc 123 to obstruct and/or unblock different air inlets and paths of the valve assembly 120. This causes the airflow 41 to redirect and move into other air spaces. The ram head 142 moves upward in the percussion shaft 116 (as depicted in FIG. 7B) as the airflow 41 is directed through the upper elbow 180, air conduit 184, and lower elbow 182 and into a second air space 219. Air pressure in the second air space 219 increases causing the second air space 219 to expand and the ram head 142 to move upward. The first air space 211 shrinks in volume during the expansion of the second air space 219. The airflow 41 continues to move into the second air space 219 until the bottom of the ram head 142 moves past the lower relief holes 216. In this position, the pressure in the second air space 219 is permitted to move through the lower relief holes 216 into the relief air space 217. The release of pressure changes the pressure acting on the valve assembly 120 and/or the valve disc 123. The ram head 142 repeatedly and continuously moves between the up position and the down position until the airflow 41 moving into the percussion mechanism 14 stops. As mentioned above, the shoe 146 delivers a compacting force to the ground 8 each time the percussion mechanism 14 is repeated.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

I claim:

1. A pneumatic percussion mechanism comprising:
   a shaft having a first end, an opposite second end, a first relief hole, and a second relief hole, wherein the first end is configured to receive an airflow;
   a compaction assembly having a ram head and a rod slidably received in the shaft such that a first air space and a second air space are defined within the shaft; and
   a valve assembly coupled to the first end of the shaft and configured to alternately direct the airflow along a first flow path into the first air space to increase air pressure therein and a second flow path to the second air space to increase air pressure therein such that the rod reciprocates in the shaft;
   wherein as the valve assembly directs the airflow into the first air space, air pressure in the first air space increases until the rod uncovers the first relief hole thereby venting the air from the first air space and causing the air pressure in the first air space to decrease such that the valve assembly redirects the airflow to the second air space; and
   wherein the valve assembly further comprises a valve disc that alternatively obstructs flow of the airflow along the first flow path and the second flow path based on air pressure in the first air space and the second air space.

2. The pneumatic percussion mechanism of claim 1, further comprising a shoe connected to the rod and configured to transfer a cyclical percussion motion to the ground.

3. The pneumatic percussion mechanism of claim 1, wherein as the valve assembly directs the airflow into the second air space, air pressure in the second air space increases until the rod uncovers the second relief hole thereby venting the air from the second air space and causing the air pressure in the second air space to decrease such that the valve assembly redirects the airflow to the first air space.

4. The pneumatic percussion mechanism of claim 3, wherein the first relief hole is spaced apart from the second relief hole such that at least one of the first relief hole and the second relief hole is covered during operation of the pneumatic percussion mechanism.

5. A pneumatic percussion mechanism comprising:
   a shaft having a first end, an opposite second end, a first relief hole, and a second relief hole, wherein the first end is configured to receive an airflow;
   a compaction assembly having a ram head and a rod slidably received in the shaft such that a first air space and a second air space are defined within the shaft; and
   a valve assembly coupled to the first end of the shaft and configured to alternately direct the airflow along a first flow path into the first air space to increase air pressure therein and a second flow path to the second air space to increase air pressure therein such that the rod reciprocates in the shaft;
   wherein as the valve assembly directs the airflow into the first air space, air pressure in the first air space increases until the rod uncovers the first relief hole thereby venting the air from the first air space and causing the air pressure in the first air space to decrease such that the valve assembly redirects the airflow to the second air space;
   wherein the second flow path is defined by a first elbow connected to the valve assembly, an air conduit having a first end connected to the first elbow and a second end, and a second elbow connected to the second end of the air conduit and the shaft at a connection hole; and
   wherein the second relief hole is between the first relief hole and the connection hole.

6. The pneumatic percussion mechanism of claim 1, further comprising a shroud positioned around the shaft and defining a relief air space into which the air from the first air space and the second air space vent before venting to atmosphere, and wherein the shroud and the relief air space prevent debris or water from entering the first and second relief holes.

7. A tamper comprising:
   a pneumatic percussion mechanism having:
      a shaft having a first end, an opposite second end, a first relief hole, and a second relief hole, wherein the first end is configured to receive an airflow;
      a compaction assembly having a ram head and a rod slidably received in the shaft such that a first air space and a second air space are defined within the shaft; and
      a valve assembly coupled to the first end of the shaft and configured to alternately direct the airflow along a first flow path into the first air space to increase air pressure therein and a second flow path to the second air space to increase air pressure therein such that the rod reciprocates in the shaft, wherein as the valve assembly directs the airflow into the first air space, air pressure in the first air space increases until the rod uncovers the first relief hole thereby venting the air from the first air space and causing the air pressure in the first air space to decrease such that the valve assembly redirects the airflow to the second air space; and
   a vibration isolator apparatus having:
      an inner shaft having a lower end coupled to the pneumatic percussion mechanism;

an outer sleeve slidably received around the inner shaft; and a spring having a first end coupled to the inner shaft and a second end coupled to the outer sleeve, wherein the spring reduces vibrations transferred from the inner shaft to the outer sleeve; and wherein the valve assembly further comprises a valve disc that alternatively obstructs flow of the airflow along the first flow path and the second flow path.

8. The tamper of claim 7, further comprising a shoe connected to the rod and configured to transfer a cyclical percussion motion to the ground.

9. The tamper of claim 7, wherein as the valve assembly directs the airflow into the second air space, air pressure in the second air space increases until the rod uncovers the second relief hole thereby venting the air from the second air space and causing the air pressure in the second air space to decrease such that the valve assembly redirects the airflow to the first air space.

10. The tamper of claim 7, wherein the first relief hole is spaced apart from the second relief hole such that at least one of the first relief hole and the second relief hole is covered during operation of the pneumatic percussion mechanism.

11. A tamper comprising:
a pneumatic percussion mechanism having:
a shaft having a first end, an opposite second end, a first relief hole, and a second relief hole, wherein the first end is configured to receive an airflow;
a compaction assembly having a ram head and a rod slidably received in the shaft such that a first air space and a second air space are defined within the shaft; and
a valve assembly coupled to the first end of the shaft and configured to alternately direct the airflow along a first flow path into the first air space to increase air pressure therein and a second flow path to the second air space to increase air pressure therein such that the rod reciprocates in the shaft, wherein as the valve assembly directs the airflow into the first air space, air pressure in the first air space increases until the rod uncovers the first relief hole thereby venting the air from the first air space and causing the air pressure in the first air space to decrease such that the valve assembly redirects the airflow to the second air space; and
a vibration isolator apparatus having:
an inner shaft having a lower end coupled to the pneumatic percussion mechanism;
an outer sleeve slidably received around the inner shaft; and
a spring having a first end coupled to the inner shaft and a second end coupled to the outer sleeve, wherein the spring reduces vibrations transferred from the inner shaft to the outer sleeve; and
wherein the second flow path is defined by a first elbow connected to the valve assembly, an air conduit having a first end connected to the first elbow and a second end, and a second elbow connected to the second end of the air conduit and the shaft at a connection hole; and
wherein the second relief hole is between the first relief hole and the connection hole.

12. The tamper of claim 7, wherein the spring extends along an exterior surface of the inner shaft.

13. The tamper of claim 7, wherein the spring is a first spring, and wherein the vibration isolator apparatus further comprises:

a second spring having a first end coupled to the inner shaft and a second end coupled to the outer sleeve, the second spring spaced apart from the first spring along an exterior surface of the inner shaft;
an upper cap connected to the upper end of the inner shaft and the first end of the first spring; and
a lower cap connected to the lower end of the inner shaft and the second end of the second spring.

14. The tamper of claim 7, wherein the vibration isolator apparatus further comprises: an upper bellows and a lower bellows, wherein the upper bellows is received around the first spring and the lower bellows is received around the second spring.

15. The tamper of claim 13, wherein the first spring and the second spring are compression springs.

16. The pneumatic percussion mechanism of claim 1, wherein the second flow path is defined by a first elbow connected to the valve assembly, an air conduit having a first end connected to the first elbow and a second end, and a second elbow connected to the second end of the air conduit and the shaft at a connection hole; and
wherein the second relief hole is between the first relief hole and the connection hole.

17. The pneumatic percussion mechanism of claim 5, further comprising a shoe connected to the rod and configured to transfer a cyclical percussion motion to the ground.

18. The pneumatic percussion mechanism of claim 5, wherein as the valve assembly directs the airflow into the second air space, air pressure in the second air space increases until the rod uncovers the second relief hole thereby venting the air from the second air space and causing the air pressure in the second air space to decrease such that the valve assembly redirects the airflow to the first air space.

19. The pneumatic percussion mechanism of claim 18, wherein the first relief hole is spaced apart from the second relief hole such that at least one of the first relief hole and the second relief hole is covered during operation of the pneumatic percussion mechanism.

20. The pneumatic percussion mechanism of claim 5, further comprising a shroud positioned around the shaft and defining a relief air space into which the air from the first air space and the second air space vent before venting to atmosphere, and wherein the shroud and the relief air space prevent debris or water from entering the first and second relief holes.

21. The tamper according to claim 7, wherein the second flow path is defined by a first elbow connected to the valve assembly, an air conduit having a first end connected to the first elbow and a second end, and a second elbow connected to the second end of the air conduit and the shaft at a connection hole; and
wherein the second relief hole is between the first relief hole and the connection hole.

22. The tamper of claim 11, further comprising a shoe connected to the rod and configured to transfer a cyclical percussion motion to the ground.

23. The tamper of claim 11, wherein as the valve assembly directs the airflow into the second air space, air pressure in the second air space increases until the rod uncovers the second relief hole thereby venting the air from the second air space and causing the air pressure in the second air space to decrease such that the valve assembly redirects the airflow to the first air space.

24. The tamper of claim 11, wherein the first relief hole is spaced apart from the second relief hole such that at least one of the first relief hole and the second relief hole is covered during operation of the pneumatic percussion mechanism.

25. The tamper of claim 11, wherein the spring extends along an exterior surface of the inner shaft.

26. The tamper of claim 11, wherein the spring is a first spring, and wherein the vibration isolator apparatus further comprises:
   a second spring having a first end coupled to the inner shaft and a second end coupled to the outer sleeve, the second spring spaced apart from the first spring along an exterior surface of the inner shaft;
   an upper cap connected to the upper end of the inner shaft and the first end of the first spring; and
   a lower cap connected to the lower end of the inner shaft and the second end of the second spring.

27. The tamper of claim 11, wherein the vibration isolator apparatus further comprises:
   an upper bellows and a lower bellows, wherein the upper bellows is received around the first spring and the lower bellows is received around the second spring.

28. The tamper of claim 26, wherein the first spring and the second spring are compression springs.

\* \* \* \* \*